United States Patent
O'Neill et al.

(10) Patent No.: US 9,294,660 B2
(45) Date of Patent: Mar. 22, 2016

(54) REMOVABLE LENSES FOR MOBILE ELECTRONIC DEVICES

(71) Applicant: olloclip, LLC, Huntington Beach, CA (US)

(72) Inventors: Patrick D. O'Neill, Huntington Beach, CA (US); Chong Pak, Lakewood, CA (US); Ryan Nguyen, Fountain Valley, CA (US)

(73) Assignee: olloclip, LLC, Huntington Beach, CA (US)

( * ) Notice: Subject to any disclaimer, the term of this patent is extended or adjusted under 35 U.S.C. 154(b) by 0 days.

(21) Appl. No.: 14/206,210

(22) Filed: Mar. 12, 2014

(65) Prior Publication Data
US 2014/0267882 A1    Sep. 18, 2014

Related U.S. Application Data

(60) Provisional application No. 61/780,642, filed on Mar. 13, 2013.

(51) Int. Cl.
H04N 5/225    (2006.01)
H04N 5/232    (2006.01)
(Continued)

(52) U.S. Cl.
CPC ............... *H04N 5/2254* (2013.01); *G02B 7/14* (2013.01); *G02B 13/001* (2013.01); *G02B 15/10* (2013.01); *H04N 5/2257* (2013.01); *H04N 5/23209* (2013.01)

(58) Field of Classification Search
CPC .................................................. H04N 5/2254
USPC ........................................................ 348/360
See application file for complete search history.

(56) References Cited

U.S. PATENT DOCUMENTS

| 971,798 A | 10/1910 | Somdal |
|---|---|---|
| D48,816 S | 4/1916 | De Ville |

(Continued)

FOREIGN PATENT DOCUMENTS

| CN | 1797169 A | 7/2006 |
|---|---|---|
| CN | 201173987 Y | 12/2008 |

(Continued)

OTHER PUBLICATIONS

Amazon.Com, "Fish Eye lens + Wide Angle Lens + Macro Lens 3-in-1 Kit for iPod iPhone 4g," [Customer Reviews included] printed Feb. 3, 2012 in 10 pages.

(Continued)

*Primary Examiner* — James Hannett
(74) *Attorney, Agent, or Firm* — Knobbe, Martens, Olson & Bear, LLP

(57) ABSTRACT

In some embodiments, an auxiliary optical system for a mobile electronic device has a mounting component that is configured to be selectively attachable and detachable from the mobile electronic device. The mounting component is configured to be coupled to and decoupled from a multi-lens component with a plurality of lenses. When the multi-lens component is coupled to the mounting component, the multi-lens component can be prevented from moving, such as sliding or rotating. In some embodiments, an auxiliary optical system for a mobile electronic device comprises a removable onboard camera lens or onboard camera of a mobile electronic device. The onboard lens or onboard camera can be removed and/or replaced with another onboard lens or onboard camera with different optical qualities.

20 Claims, 4 Drawing Sheets

(51) Int. Cl.
*G02B 7/14* (2006.01)
*G02B 13/00* (2006.01)
*G02B 15/10* (2006.01)

(56) References Cited

U.S. PATENT DOCUMENTS

| | | | |
|---|---|---|---|
| D138,816 S | 9/1944 | Glasser | |
| D141,692 S | 6/1945 | Nemeth | |
| 2,428,719 A | 10/1947 | Nemeth | |
| D148,816 S | 2/1948 | Pemstein | |
| D181,908 S | 1/1958 | Hertzler | |
| D183,253 S | 7/1958 | Gebele | |
| 3,090,282 A | 5/1963 | Angenieux | |
| 3,133,140 A | 5/1964 | Winchell | |
| 3,138,060 A | 6/1964 | Eggert et al. | |
| 3,454,323 A | 7/1969 | Dierks et al. | |
| 3,620,149 A | 11/1971 | Ogihara | |
| 3,680,461 A | 8/1972 | Amesbury et al. | |
| 3,796,489 A | 3/1974 | Sone et al. | |
| 3,817,601 A | 6/1974 | Colaiace et al. | |
| 3,828,991 A | 8/1974 | Moore | |
| D234,007 S | 12/1974 | Ritter | |
| D248,160 S | 6/1978 | Feinbloom et al. | |
| 4,264,167 A | 4/1981 | Plummer | |
| 4,305,386 A | 12/1981 | Tawara | |
| D264,048 S | 4/1982 | Magner | |
| D274,336 S | 6/1984 | Huckenbeck | |
| D274,691 S | 7/1984 | Wallace | |
| D275,766 S | 10/1984 | Suzuki | |
| D295,871 S | 5/1988 | Charles | |
| 4,760,510 A | 7/1988 | Lahti | |
| 4,864,333 A | 9/1989 | Barber | |
| 4,893,143 A | 1/1990 | Sheng-Huei | |
| 5,050,963 A | 9/1991 | Murakami | |
| 5,054,886 A | 10/1991 | Ozaki et al. | |
| 5,311,358 A | 5/1994 | Pederson et al. | |
| 5,416,544 A | 5/1995 | Stapleton | |
| 5,455,711 A | 10/1995 | Palmer | |
| 5,461,444 A | 10/1995 | Okura et al. | |
| D374,878 S | 10/1996 | Palmer | |
| D381,347 S | 7/1997 | Miyahara | |
| D387,787 S | 12/1997 | Palmer | |
| 5,781,351 A | 7/1998 | Murakami et al. | |
| 5,831,778 A | 11/1998 | Chueh | |
| 6,115,197 A | 9/2000 | Funahashi | |
| 6,545,825 B2 | 4/2003 | Shoji et al. | |
| 6,752,516 B1 | 6/2004 | Beadle | |
| 6,889,006 B2 | 5/2005 | Kobayashi | |
| 6,924,950 B2 | 8/2005 | Gventer et al. | |
| 6,967,790 B2 | 11/2005 | Wei | |
| D544,512 S | 6/2007 | Hunag | |
| D546,863 S | 7/2007 | Ito et al. | |
| D560,702 S | 1/2008 | Tokiwa et al. | |
| 7,600,932 B2 | 10/2009 | Senba et al. | |
| 7,604,423 B2 | 10/2009 | Nagata et al. | |
| 7,636,518 B2 | 12/2009 | Tanaka et al. | |
| 7,639,353 B2 | 12/2009 | Rooke | |
| D617,360 S | 6/2010 | Endo et al. | |
| 7,782,375 B2 | 8/2010 | Chambers et al. | |
| D626,950 S | 11/2010 | Roman | |
| 7,830,628 B2 | 11/2010 | Schaefer | |
| 7,967,513 B2 | 6/2011 | Zhang | |
| 8,000,589 B2 | 8/2011 | Chan | |
| 8,040,621 B2 | 10/2011 | Chang et al. | |
| D649,970 S | 12/2011 | Lyford et al. | |
| D650,821 S | 12/2011 | Verhey | |
| 8,073,324 B2* | 12/2011 | Tsai | 396/544 |
| 8,208,210 B2 | 6/2012 | An et al. | |
| 8,279,544 B1 | 10/2012 | O'Neill | |
| D678,379 S | 3/2013 | O'Neill et al. | |
| D686,265 S | 7/2013 | O'Neill et al. | |
| 8,508,868 B2 | 8/2013 | Weber et al. | |
| D692,472 S | 10/2013 | Samuels et al. | |
| 8,573,810 B2 | 11/2013 | Mahaffey et al. | |
| 8,593,745 B2 | 11/2013 | O'Neill | |
| D695,295 S | 12/2013 | Chumanov et al. | |
| D695,332 S | 12/2013 | O'Neill et al. | |
| D697,957 S | 1/2014 | Glasse et al. | |
| D697,958 S | 1/2014 | O'Neill et al. | |
| 8,639,106 B1* | 1/2014 | Gleason et al. | 396/133 |
| D699,275 S | 2/2014 | Samuels et al. | |
| D700,228 S | 2/2014 | O'Neill et al. | |
| 8,687,299 B1 | 4/2014 | Sandford et al. | |
| 8,760,569 B2* | 6/2014 | Yang | 348/373 |
| 8,891,187 B2 | 11/2014 | O'Neill | |
| D723,601 S | 3/2015 | O'Neill et al. | |
| 9,188,764 B2 | 11/2015 | O'Neill et al. | |
| 2004/0218081 A1 | 11/2004 | Lohr et al. | |
| 2005/0088612 A1 | 4/2005 | Smith et al. | |
| 2005/0099526 A1 | 5/2005 | Wu et al. | |
| 2007/0049340 A1 | 3/2007 | Wang et al. | |
| 2007/0053682 A1 | 3/2007 | Chang | |
| 2007/0196090 A1 | 8/2007 | Kubo | |
| 2007/0275763 A1 | 11/2007 | Sawadski et al. | |
| 2007/0280677 A1 | 12/2007 | Drake et al. | |
| 2008/0037011 A1 | 2/2008 | Rooke | |
| 2008/0174891 A1 | 7/2008 | Kudoh | |
| 2009/0109558 A1 | 4/2009 | Schaefer | |
| 2009/0169198 A1 | 7/2009 | Chang | |
| 2009/0181729 A1* | 7/2009 | Griffin et al. | 455/575.1 |
| 2010/0048243 A1 | 2/2010 | Fourquin et al. | |
| 2010/0208369 A1 | 8/2010 | Shin | |
| 2010/0328420 A1* | 12/2010 | Roman | 348/14.08 |
| 2011/0019294 A1 | 1/2011 | Strong | |
| 2011/0043683 A1 | 2/2011 | Beach et al. | |
| 2011/0110654 A1 | 5/2011 | Maki | |
| 2012/0157160 A1 | 6/2012 | Ozcan et al. | |
| 2013/0028591 A1* | 1/2013 | Hicks | 396/544 |
| 2013/0094846 A1 | 4/2013 | Apter | |
| 2013/0148954 A1 | 6/2013 | Uehara et al. | |
| 2013/0206614 A1 | 8/2013 | O'Neill et al. | |
| 2014/0078594 A1 | 3/2014 | Springer | |
| 2014/0320987 A1 | 10/2014 | O'Neill et al. | |

FOREIGN PATENT DOCUMENTS

| | | |
|---|---|---|
| CN | 301914880 | 5/2012 |
| JP | 10-115858 | 5/1998 |
| JP | 2000-311427 | 11/2000 |
| JP | 2003-295307 | 10/2003 |
| JP | 2004-191897 | 7/2004 |
| JP | 2006-251150 | 9/2006 |
| JP | 2007-079362 | 3/2007 |
| JP | 2007-206137 | 8/2007 |
| JP | 2007-219433 | 8/2007 |
| KR | 10-0842373 | 7/2008 |
| WO | WO 2006/002674 | 1/2006 |
| WO | WO 2012/082738 | 6/2012 |
| WO | WO 2012/128936 | 9/2012 |

OTHER PUBLICATIONS

Amazon.com, "Universal Smart Phone Camera Lens Kit . . . ," http://www.amazon.com/Universal- Camera-including-Telephoto-Microfiber/dp/B00AV3ZUQA/ref=sr_1_5?ie=UTF8&qid=14165114868&sr=8-5&keywords=universal+smart+phone+camera+lens+kit+including+one+12x+telephoto+manual+focus+lens, [Customer Review Dated Jan. 27, 2013] printed Nov. 9, 2014 in 7 pages.
ePHOTOzine, "Olloclip 3-In-One iPhone Photo Lens Review", http://www.ephotozine.conn/article/olloclip-3-in-one-iphone-photo-lens-review-18816, Mar. 23, 2012 in 7 pages.
Focal, "Auxiliary Lens Set for Kodak Disc Camera", circa 1980s (photograph).
Kickstarter.Com, "Glif—iPhone 4 Tripod Mount & Stand", http://www.kickstarter.com/projects/danprovost/glif-iphone-4-tripod-mount-and-stand, Oct. 3, 2013 [Selected screenshots from video].
Uncrate, "Olloclip", http://web.archive.org/web/20130120204350/http://uncrate.com/stuff/olloclip/ as captured Jan. 20, 2013 in 2 pages.

* cited by examiner

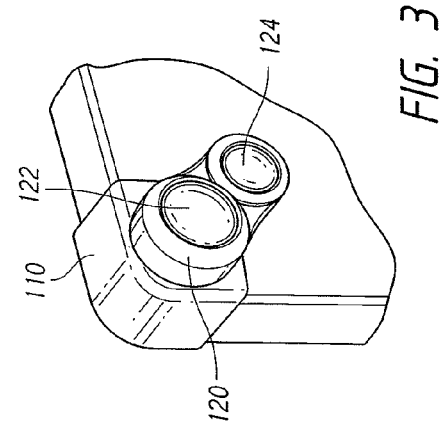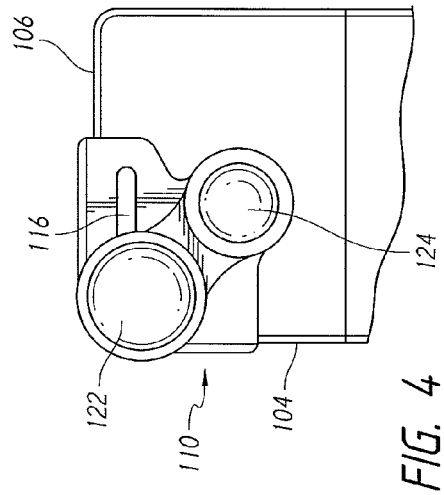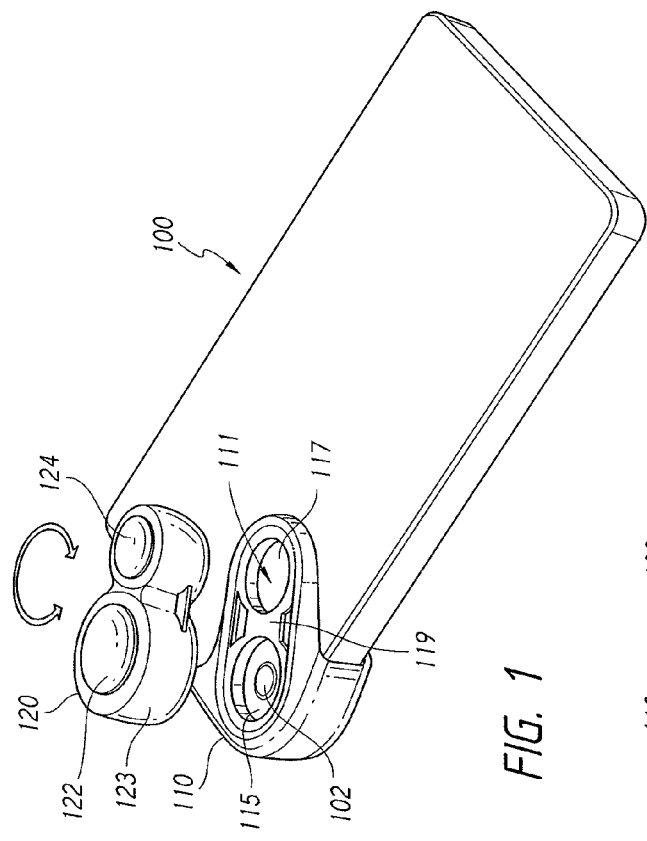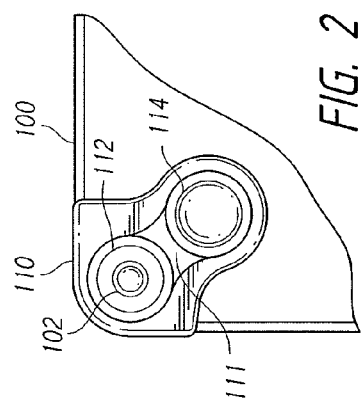

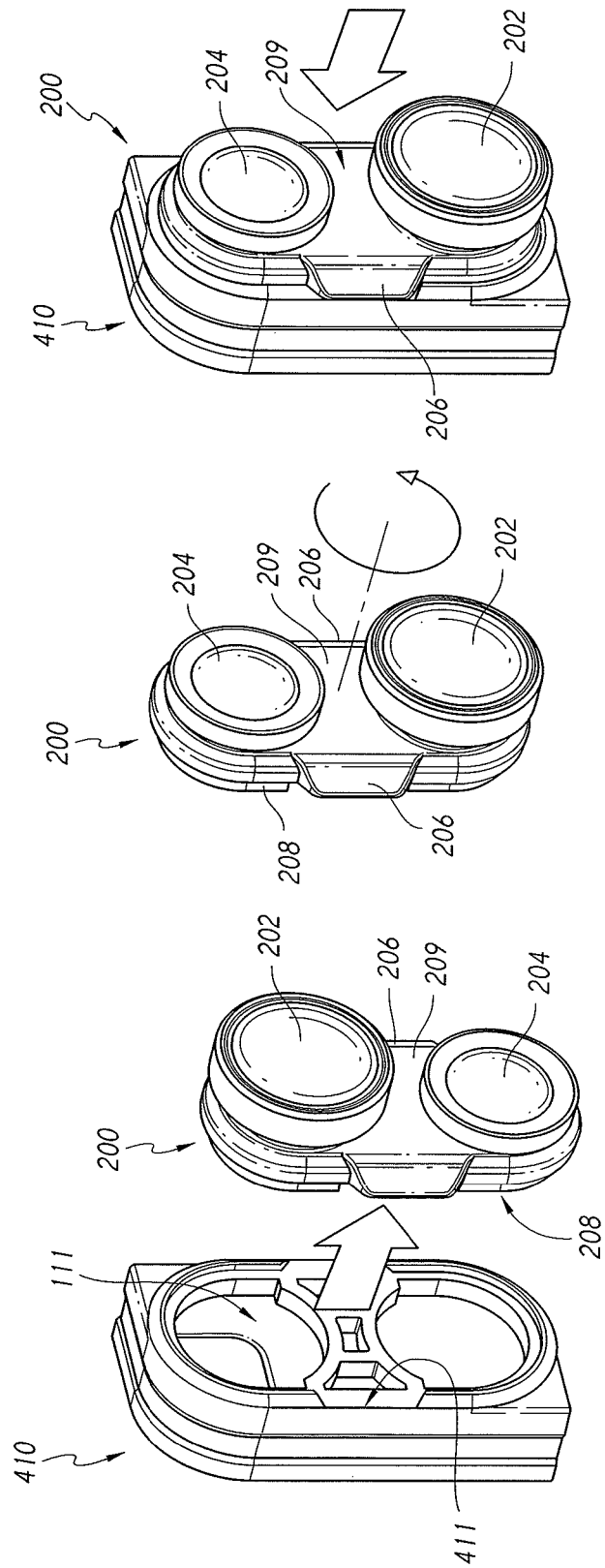

US 9,294,660 B2

REMOVABLE LENSES FOR MOBILE ELECTRONIC DEVICES

RELATED APPLICATION

This application claims the benefit of U.S. Provisional Patent Application No. 61/780,642, filed on Mar. 13, 2013, which is incorporated by reference herein in its entirety for all that it discloses.

BACKGROUND OF THE INVENTIONS

1. Field of the Inventions

This invention relates generally to accessories for mobile electronic devices (e.g., mobile telephones, mobile texting devices, mobile information storage and display devices, electronic pad devices, laptop computers, desktop computers, etc.), and specifically to removable functional components for mobile electronic devices.

2. Description of the Related Art

In recent years, many advances in computer networking and processing technology have made it possible for communication devices to include cameras that permit users to capture images. In many cases, these images can be stored, processed, and transmitted. However, there are many design constraints on onboard cameras in mobile electronic devices that can limit the weight, size, expense, shape, adjustability, and overall quality of the lensing systems of such cameras. Consequently, many cameras in communications devices are inadequate for a wide variety of photographic needs and may produce poor quality photographic images.

SUMMARY OF THE SPECIFICATION

In some embodiments, an auxiliary optical system for a mobile electronic device has a mounting component that is configured to be selectively attachable and detachable from the mobile electronic device. The mounting component is configured to be coupled to and decoupled from a multi-lens component with a plurality of lenses. When the multi-lens component is coupled to the mounting component, the multi-lens component can be prevented from moving, such as sliding or rotating.

In some embodiments, an auxiliary optical system for a mobile electronic device comprises a removable onboard camera lens or onboard camera of a mobile electronic device. The onboard lens or onboard camera can be removed and/or replaced with another onboard lens or onboard camera with different optical qualities.

BRIEF DESCRIPTION OF THE DRAWINGS

Certain embodiments of the inventions will now be discussed in detail with reference to the following figures. These figures are provided for illustrative purposes only, and the inventions are not limited to the subject matter illustrated in the figures.

FIG. 1 illustrates a front perspective view of an auxiliary optical system in use with a mobile communication device.

FIG. 2 illustrates a front plan view the auxiliary optical system and mobile communication device of FIG. 1.

FIG. 3 illustrates a front and side perspective view of another embodiment of an auxiliary optical system.

FIG. 4 illustrates a front plan view of another embodiment of an auxiliary optical system.

FIG. 5 illustrates a front and side perspective view of another embodiment of an auxiliary optical system for use with a mobile communication device with an optical component in a first position.

FIG. 6A illustrates a front and side perspective view of the optical component of the optical system of FIG. 5 being moved into a second position.

FIG. 6B illustrates a front and side perspective view of the auxiliary optical system of FIG. 5 with the optical component in the second position.

DETAILED DESCRIPTION OF EXAMPLES

Figure 7C:
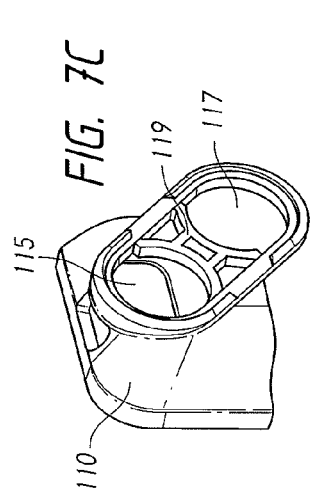
FIGS. 7C-7E are front and side perspective views of embodiments of base portions of auxiliary optical systems.

Auxiliary optical systems comprising lens components or devices can be removably attached to mobile electronic devices to selectively enhance or otherwise change an image created from light that is transmitted through a lens to an onboard camera lens of the mobile electronic devices. For example, lens components such as those disclosed in U.S. Pat. No. 8,279,544, which is incorporated herein by reference in its entirety for all that it discloses, may be secured to a mobile electronic device by a clip that contacts generally opposing sides of the mobile electronic device. The lens component may include a different lens on each side of the clip portion (e.g., one side may have a fisheye lens, while the generally opposing side may have a wide angle, macro, telephoto, or some other photographic lens). When a user wishes to use a different lens, the user may rotate the lens component so that the lens from other side of the clip portion is positioned to alter light passing through to the onboard camera lens of the mobile electronic device.

Various examples are illustrated in the drawings and/or described in the text of this specification. It is contemplated that any individual features, steps, structures, or methods, can be used separately or in combination with any other individual features, steps, structures, or methods disclosed herein or present in the art. No features, steps, structures, or methods disclosed in this specification are essential or indispensable. A mobile communication device is a mobile electronic device capable of communicating with one or more other electronic devices.

The mobile electronic device 100 illustrated in FIG. 1 is an iPhone 5, sold by Apple, Inc. of Cupertino, Calif. Any other mobile electronic device can be used. In this example, an onboard camera lens 102 is positioned near a first corner of the mobile device 100 where first and second generally orthogonal sides 104 and 106 generally converge. The first and second sides 104, 106 can be located on generally opposing sides of the mobile electronic device 100 from a second corner or from third and fourth generally orthogonal sides, thereby positioning the input or output devices a substantial distance away from the third and fourth generally orthogonal sides.

As illustrated in FIGS. 1-4, a base or mounting component 110 can be permanently or removably attached to the mobile electronic device 100 using any or all of the features, structures, and/or steps illustrated or described in U.S. Pat. No. 8,279,544. For example, as illustrated, the mounting component 110 may be configured to clip onto a corner of the mobile electronic device 100, such that mounting component 110 contacts at least two generally orthogonal sides 104, 106 of the mobile electronic device 100. In some embodiments, the mounting component 110 can comprise an assembled or a unitary housing comprising one or more of: a first side configured to contact, or to be positioned adjacent to, a face of a mobile electronic device 100 with an onboard camera; a second side generally opposite from the first side and configured to contact, or to be positioned adjacent to, a face of a mobile electronic device 100 with a display screen visible to a user of the mobile electronic device 100; an upper side configured to be positioned along (in contact with or adjacent to) an upper edge of a mobile electronic device 100; a first lateral side configured to be positioned along (in contact with or adjacent to) a first side edge of a mobile electronic device 100; and a second lateral side that is generally opposite from the first lateral side, the second lateral side being configured to be positioned along (in contact with or adjacent to) a second side edge of a mobile electronic device 100. As illustrated, any or all of the first lateral side, the second lateral side, and/or the upper side can extend less than the entire distance across the corresponding edge of the mobile electronic device.

In some embodiments, a mounting component 110 can comprise one or more movable mounting structures (not shown) such as one or more latches, screws, levers, buttons, or cams, etc., or one or more non-movable mounting structures such as one or more magnets, snaps, hook-and-loop attachments, adhesive tapes, etc.

The mounting component 110 can be configured to be attached to the mobile electronic device 100 by a friction fit, such that the mobile electronic device grasps onto a portion of the mobile electronic device 100 in a manner that resists sliding or removal, unless a user applies a larger force to remove the mounting component 110. The mounting component 110 can comprise a receiving portion, such as a groove or slot, into which a portion of the mobile electronic device 100 (such as a corner of the device, as illustrated in FIG. 1) is configured to be inserted and retained. In some embodiments, the mounting component 110 has a plurality of user-adjustable positions. For example, the mounting component 110 can have a first release position in which the receiving portion is larger or wider or more open or otherwise less confining than a second attachment position in which the receiving portion is smaller or narrower or more closed or otherwise more confining.

As illustrated, the mounting component 110 can comprise an optical mounting region 111, such as an elongate recess, that is configured to receive an optical component, such as a multi-lens component 120. In some embodiments, there is only an optical mounting region on one side of mounting component 110 that is configured to be positioned near the side of the mobile electronic device 100 that includes an onboard camera, since attaching lenses on the other side of the mounting component 120 may unnecessarily add bulk and weight to the auxiliary lens system that is not needed because a plurality of lenses is already included in the multi-lens component. In some embodiments, when many lenses are desired, an optical mounting region 111 can be provided on both sides of the mounting component 110.

The optical mounting region 111 can comprise first and second lens apertures or lens seats 115, 117, and a divider 119 positioned between the lens seats 115, 117. The divider 119 can optically separate the lens seats, can provide strength in the optical mounting region 11 against twisting or distortion, and/or can provide an abutting surface against which the multi-lens component 120 can be positioned for attachment. In some embodiments, at least a portion of the optical mounting region 111 can be configured to be positioned generally over, or generally in alignment with, or generally covering, an onboard camera of a mobile electronic device 100 when the mounting component 110 is attached to the mobile electronic device 100. In some embodiments, as illustrated, the onboard camera is located in a corner region of the mobile electronic device. In some embodiments, the onboard camera is located in an upper middle region of the mobile electronic device. Any mounting component described or illustrated in this specification can be configured or attached in any way illustrated and/or disclosed in the '544 patent for attaching the retainer portion to a mobile communication device, or in any other way. In some embodiments, as illustrated, when the mounting component 110 and the multi-lens component 120 are attached to each other, the two components can function as a single lens system such that the mounting component 110 can be attached or detached from the mobile electronic device without attaching or detaching the mounting component 110 to or from the multi-lens component.

Figure 8:
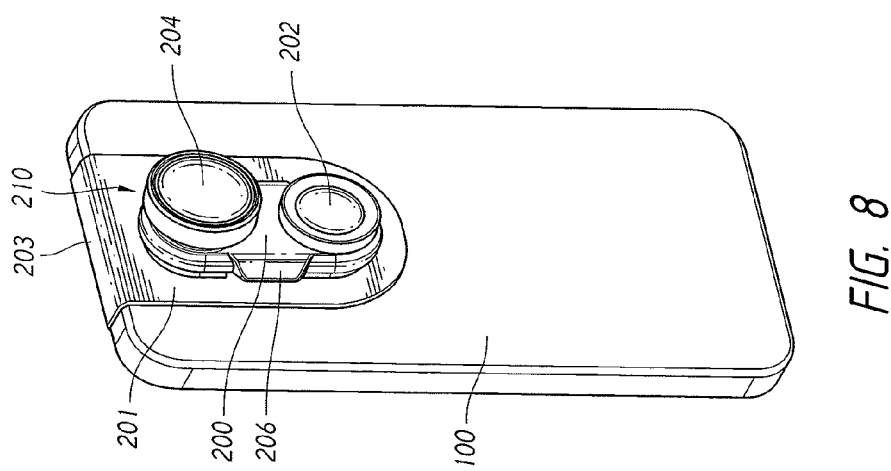
FIG. 8 illustrates a front and side perspective view of an auxiliary optical system for use with a generally centrally positioned onboard camera on a mobile communication device.

In some embodiments, the onboard camera is located in a generally central region of the mobile electronic device 100, with the mounting component 210 being centrally positioned, as illustrated in the example of FIG. 8. The mounting component 210 as illustrated in FIG. 8 can include a first side 201 configured to contact, or to be positioned adjacent to, a face of the mobile electronic device 100 with an onboard camera, an upper side 203 configured to be positioned along (in contact with or adjacent to) an upper edge of a mobile electronic device 100, and/or a full or partial second side (not shown) that is generally opposite from the first side and that is configured to contact, or to be positioned adjacent to, a face of a mobile electronic device 100 with a display screen visible to a user of the mobile electronic device. In some embodiments, the second side comprises one or more overhanging hook-like portions that are configured to contact the face of the mobile electronic device with a display screen. The mounting component 210 can include any features or structures described or illustrated in this specification for any other mounting component in addition to or instead of those described or illustrated specifically in connection with the mounting component 210.

The mounting component 110 can be configured to securely receive a multi-lens component 120 for altering or enhancing images taken by the onboard camera lens 102 of the mobile electronic device 100 in a removable manner. In some embodiments, as illustrated, the multi-lens component 120 can be configured to snap into place on the mounting component 110, such as by positioning one or more lateral wings, as shown in FIG. 1, into an interference fit with one or more recesses in the mounting component 210. As illustrated, the multi-lens component 120 can comprise a unitary base body portion with at least two lenses embedded therein at the same time, such that the at least two lenses can be removed from the mounting component 110 at the same time in a single motion. In some embodiments, as illustrated, the multi-lens component 120 does not screw into position on the mounting component 110, since screwing may require more time, care, and dexterity than a single-motion attachment such as a snap-fit. Screwing the multi-lens component 120 into the mounting component 110 may not be convenient when a user is rushing to take advantage of a transitory photo opportunity. In some embodiments, the multi-lens component 120 can be configured to slide or screw or pivot or latch or otherwise move into position on the mounting component 110.

As illustrated, the multi-lens component 120, when attached to the mounting component 110, can be configured to position at least two optical regions 122, 124 on a first side of the mobile electronic device that includes an onboard camera, at the same time. As illustrated in the examples shown in the figures, the two or more optical regions 122, 124 can be arranged not to be in optical communication with each other, but are rather separate and alternative optical regions 122, 124. In some embodiments, the auxiliary lens system can comprise one or more compound lenses formed of multiple discrete lenses that are in optical communication with each other, permitting the same light to pass through a plurality of lenses before impinging on the onboard camera of the mobile electronic device.

In some embodiments, as illustrated, the outer periphery of the multi-lens component 120 can generally correspond to or generally match the outer periphery of the optical mounting region 111 to help provide a secure attachment between the multi-lens component 120 and the mounting component 110. The outer periphery of the multi-lens component 120 can be smaller than the outer periphery of the mounting component 110. As illustrated in the figures, the multi-lens component 120 can be secured in a non-movable (e.g., non-rotatable, and/or non-slidable, etc.) configuration when attached to the mounting component 110 until such time as the multi-lens component 120 is detached or decoupled from the mounting component 110.

The multi-lens component 120 can include two or more lenses 122 and 124 designed or configured to enhance or alter light passing through each lens to the onboard camera lens 102 of the mobile electronic device 100 in different ways. In some embodiments, as illustrated, the multi-lens component 120 includes only two lenses in order to diminish the weight and/or bulk of the multi-lens component. Each of the plurality of lenses can be surrounded, substantially or entirely, by a protective periphery, such as a ring. A plurality of lenses, as shown, can be effectively coupled to each other in the multi-lens component by joining them along such protective peripheries, as shown in FIG. 1. As illustrated, in some embodiments, the multi-lens component is configured to receive ambient light that is impinging on the side of the mobile electronic device with the onboard camera. In some embodiments, a suitable single-lens component can be attached to the mounting component 110. Except as otherwise specified, any description of a multi-lens component 120 can also apply to a single-lens component. The multi-lens component may include a first lens with a first optical capability, such as a fisheye lens 122, and a second lens with a second optical capability, such as a wide angle lens 124.

The term "lens" in this specification is used in accordance with its ordinary meaning and includes lenses with optical power (e.g., magnifying or wide-angle lenses) as well as lenses without optical power (e.g., plano lenses), and/or lenses that can provide other features or characteristics, such as one or more lenses that are configured to protect the onboard camera from damage, or are configured to alter the spectrum of transmitted light, lenses that produce polarized light to reduce glare, anti-reflective lenses, anti-scratch lenses, fish-eye lenses, and/or lenses with any combination of the foregoing features, etc. In some embodiments, one or more individual lenses of the multi-lens component 120 can be removed from the body of the multi-lens component 120, cleaned, modified, and/or replaced with one or more other individual lenses. In some embodiments, the attachment and detachment of the individual lenses of the multi-lens component 120 to the body of the multi-lens component 120 can be accomplished by a temporary attachment, such as a screwing motion, a snap-fit, a clip, or any other suitable temporary attachment, or by a permanent attachment, such as adhesive, sonic welding, solvent, or any other suitable permanent attachment.

In some embodiments, as illustrated, the connection between the mounting component 110 and the multi-lens component 120 can be performed in a plurality of different positions, locations, and/or orientations. For example, as illustrated, a user may connect the mounting component 110 and the multi-lens component 120 in a first position or orientation to position the lens, such as the fisheye lens 122, for use in general alignment with or in optical communication with the onboard camera of the mobile electronic device 100 while taking photographs with the mobile electronic device 100. The user may then detach or decouple the multi-lens component 120 from the mounting component 110, which can be configured to remain in place on the mobile electronic after the multi-lens component 120 is removed, and then the user can change the position of the multi-lens component 120 on the mounting component 110, such as by rotating, pivoting, or otherwise moving the multi-lens component 120, and then reattaching the multi-lens component 120 to the mounting component 110 in a second position, thereby positioning a different lens, such as the wide angle lens 124, in general alignment with (e.g., in optical communication with) the onboard camera lens 102 of the mobile electronic device 100. The fisheye lens 122 and wide angle lens 124 illustrated in FIG. 1 are illustrative only, and are not intended to be limiting. In some embodiments, a multi-lens component 120 may include other types of lenses, such as one or more telephoto lenses, macro lenses, polarizing lenses or filters, coloring lenses or filters, anti-glare lenses or filters, and the like, and/or any combinations thereof.

In some embodiments, as illustrated, in each of the plurality of different mounting positions, a plurality of different lenses are configured to be disposed on the same side of the mobile electronic device 100 at the same time. In some embodiments, the detachability of the multi-lens component 120 from the mounting component 110 can provide certain advantages. For example, a collection of a plurality of small multi-lens components 120 can be provided with many different optical characteristics for different photographic needs, which can be attached or detached as needed, without requiring all of such different lenses to be attached in some manner to the mobile electronic device at the same time, which would increase the overall weight and size of the auxiliary lens system. Also, in some embodiments, the detachability of the multi-lens component 110 can allow it to be used on a plurality of different mobile devices (e.g., a phone or a pad device, several different phones among friends or family members, etc.) in a quick and easy way, without having to remove or replace the mounting components 110 on such devices. In some situations, the mounting component 120, either by itself or as integrated into a case for a mobile electronic device, can remain attached to the mobile electronic device 100 for a long period of time, and the multi-lens component 120 can be attached only momentarily as needed when capturing a photographic image.

As shown in FIG. 4, one or more lenses 122, 124 of the multi-lens component 120 can comprise an outer periphery that does not extend beyond or does not extend substantially beyond the outer periphery of the outer edge of the mobile electronic device 100 and/or the outer periphery of the mounting component 120. As illustrated, the mounting component 110 can include a structure or component configured to facilitate or enhance conveyance of energy or information to and/or from an input and/or output component of the mobile electronic device 100. For example, the mounting component 110 can include a light-conveying component such as a fiber optic or polycarbonate component 116 that facilitates the conveyance of light from a flash on the mobile electronic device 100 to an area generally in front of the mounting component 110. In some embodiments, the mounting component 110 can include an energy conveying path that is generally open and generally unobstructed between a region on the mobile device and a region on the mounting component 110 for assisting in the transmission of energy to or from an input and/or output device on a mobile electronic device while generally preserving the quality of a signal, image, or information being transmitted by such energy. Examples of transmitted energy conveyed to or from mobile electronic devices include electrical impulses, acoustic sound waves, visible light, or other electromagnetic energy.

FIG. 5 illustrates an embodiment of a multi-lens component 200 that may be used with the base or mounting component 110 of FIG. 1 or with any other type of base or mounting component, such as base or mounting component 410. The multi-lens component 200 can include two or more lenses 202, 204 or other components configured to alter light as it passes to an onboard camera lens of a mobile electronic device. In addition, the multi-lens component 200 can be configured with gripping structure such as a groove 208 that facilitates gripping the multi-lens component 200 to remove it from the mounting component 110 for rotation, storage, etc. In some embodiments, the gripping structure may comprise a ridge or protrusion instead of, or in addition to, the groove 208. The ridge or protrusion may also facilitate gripping the multi-lens component 200.

The multi-lens component 200 may also include a first attachment structure, such as a detent 206 or some other protrusion or other inward or outward surface feature, to facilitate securing the multi-lens component 200 in a mounting component 410. The mounting component 410 may have a complimentary second attachment structure 411, such as a recess configured to receive the detent 206, thereby holding the multi-lens component 200 in place. The attachment structures may be sized and shaped such that the multi-lens component 200 may be snapped or otherwise removably secured into place and held by the mounting component 110 during normal use, while also being removable by hand so that it may be rotated or stored.

Any multi-lens component 120, 200 may include a housing 123, 209 and multiple lens components 122, 124, 202, 204. In some embodiments, the housing 123, 209 may be a polycarbonate housing. One or more individual lens components with one or more different optical characteristics, such as a fisheye lens 202 and a wide angle lens 204 may be removably attached to the housing 209. For example, in some embodiments, the housing 209 may include threaded receptacles (not shown) for lens components 202, 204, and the lens components 202, 204 may be screwed into the housing 209. In some embodiments, one or more lens components 202, 204 may be formed from a metal such as aluminum (e.g., anodized aluminum). In some embodiments, the housing 209 may include one or more permanently or semi-permanently integrated lenses, such as a macro lens (not shown), which may be positioned beneath one or more of the other lenses in some embodiments. Other lens components, such as the wide angle lens component 204, may be removably attached to the housing 209 over the integrated macro lens for use. When a user later decides to use the macro lens, the wide angle lens component 204 or other lens component can be removed (e.g., unscrewed from the housing 302).

Figure 7D:
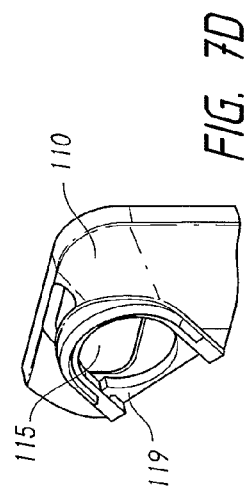
Figure 7E:
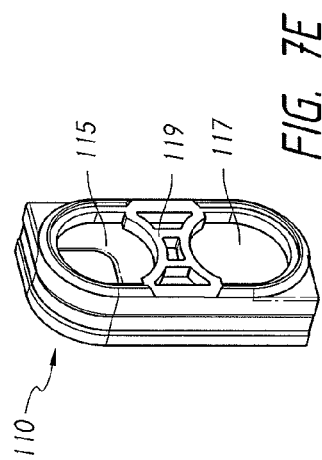
Figure 7B:
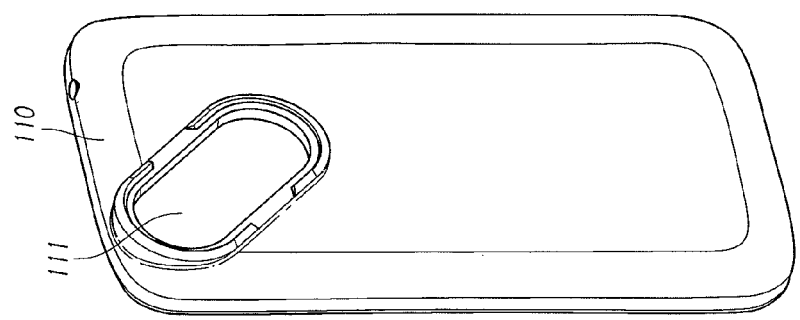
FIG. 7B illustrates a front and side perspective view of a base portion of another embodiment of an auxiliary optical system with a generally slanted attachment region configured to receive an optical component.
Figure 7A:
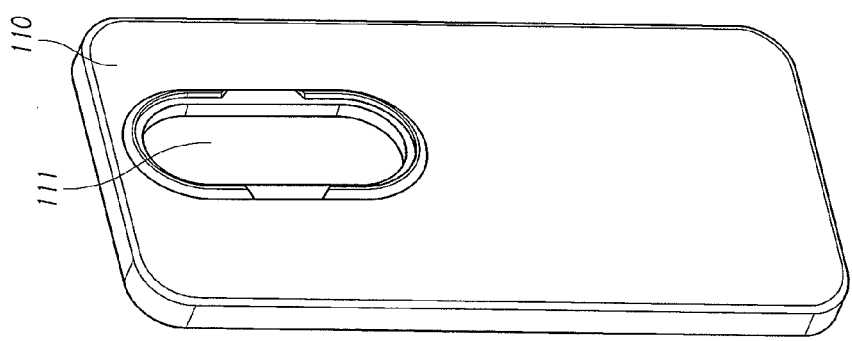
FIG. 7A illustrates a front and side perspective view of a base portion of an embodiment of an auxiliary optical system with a generally centrally positioned attachment region configured to receive an optical component.

As illustrated in FIGS. 7A-7E, the mounting component 110 can have many different sizes, shapes, and/or configurations. In some embodiments, as illustrated in FIGS. 7A and 7B, the mounting component 110 can be a case for a mobile electronic device 100, or it can be integrated, either permanently or removably, into a case for a mobile electronic device 100. In some embodiments, as illustrated, the case can comprise a first face that is configured to cover, entirely or partially, a face of the mobile electronic device 100 that includes an onboard camera, and/or the case can comprise one or more sidewalls that are configured to cover, entirely or partially, one or more sides of the mobile electronic device 100. The case can comprise an optical mounting region 111 that is configured to receive a multi-lens component 120, 200. In some embodiments, the optical mounting region 111 is positioned in a generally upper central region on the case and/or is oriented in a generally vertical direction, as illustrated in FIG. 7B; and in some embodiments, at least a portion of the optical mounting region 111 is located in a corner region on the case and/or is oriented in a generally oblique or diagonal direction, neither vertical nor horizontal, as illustrated in FIG. 7A. The optical mounting region 111 in any embodiment can be generally oblong and/or generally elliptical, as illustrated in FIGS. 1, 2, 7A, 7B, 7C, and 7E, with first and second generally curved ends and a generally straight intermediate region. In some embodiments, the optical mounting region 111 can be configured to receive a single-lens component, as illustrated in FIG. 7D.

In some embodiments, a manufacturer can provide an auxiliary lens system comprising a mounting component 110, 410 and a first multi-lens component 120, 200 to a consumer, and then the manufacturer can instruct a user to attach the mounting component 110, 410 and the multi-lens component 120, 200 to a mobile communication device 100 and to remove the first multi-lens component 120, 200 and replace it with a second multi-lens component, 120, 200. The first and second multi-lens components 120, 200 can have different optical features, as described elsewhere in this specification.

Figure 10:
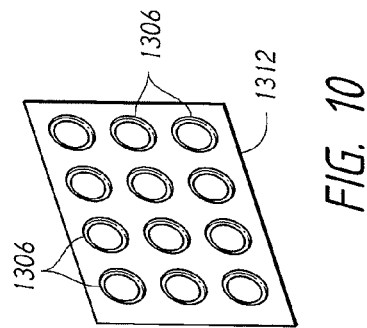
FIG. 10 illustrates a front perspective view of a collection of interchangeable lenses for use with a mobile communication device in which the onboard camera has a lens that is configured to be removable and replaceable.
Figure 9:
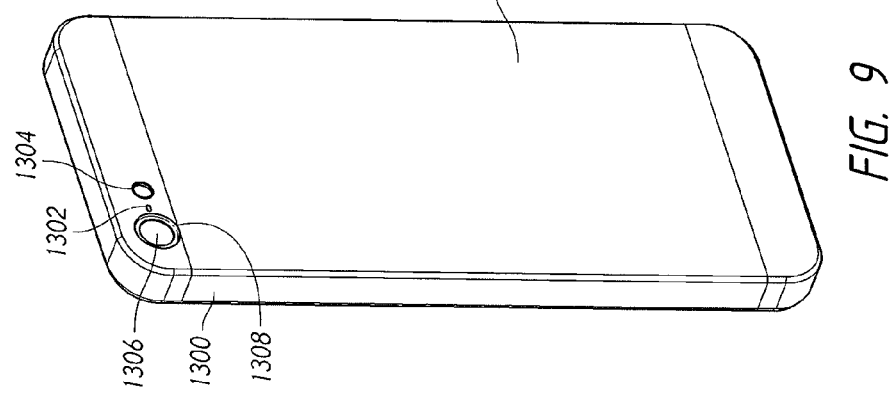
FIG. 9 illustrates a front and side perspective view of a mobile communication device with an onboard camera comprising a removable and/or interchangeable lens.

As illustrated in FIGS. 9-10, in some embodiments, an onboard lens 1306 or a portion of an onboard lens of an onboard camera of a mobile electronic device 1300 can be removed from the mobile electronic device 1300 and replaced with a different onboard lens 1306 or portion thereof by a consumer. Also, the onboard camera itself can be removed and replaced. All references herein to an onboard lens can be applied to an onboard camera as well as or instead of an onboard lens. The onboard lens 1306 can be positioned inside of a hole or recess through an outside essentially planar surface 1310 of the mobile electronic device 1300. In some embodiments, as illustrated, the onboard lens 1306 is removably attachable to the mobile electronic device 1300 separate from another component of the mobile electronic device 1300. For example, in some embodiments, the onboard lens 1306 is not attached to or embedded in a panel or covering or other planar surface 1310 of the mobile electronic device 1300. Rather, the onboard lens 1306 can be removed and/or replaced by a consumer without removing or replacing a panel or covering or other planar surface 1310 of the mobile electronic device. In this way, the internal electronics of the mobile electronic device are not exposed to dust or contamination or damage during lens replacement, and replacement lenses can be stored in a low-profile, small volume case, without the bulk of a collection of panels or coverings with embedded lenses to also store.

As illustrated, a retainer 1308, such as a retainer ring, can be removably affixed to a portion of the mobile electronic device 1300 in a way that helps to removably retain the onboard lens 1306 inside of the hole or recess in the mobile electronic device 1300, such as by positioning the retainer on top of and/or generally surrounding the lens 1306, as shown in FIG. 9. In some embodiments, the retainer 1308 is attached using an attachment motion, such as a rotation or a press-fit or a snap fit or a sliding motion, to removably secure the retainer 1308 in place on the mobile electronic device 1300. In some embodiments, the retainer 1308 is configured to move from its position as shown in FIG. 13, generally surrounding the onboard lens, to a position toward or even off of a side (e.g., lateral or upper) edge of the mobile electronic device 1300. In some embodiments, the retainer 1308 is separate from the removable onboard lens 1306 and in some embodiments the retainer 1308 is integral or unitary with the onboard lens 1306.

A user's fingers can be used to perform the attachment motion, or an attachment tool (not shown) that interfaces with the retainer 1308 can be used to perform the attachment motion. In some embodiments, the attachment tool can comprise a ring of other attachment structure with one or more gripping structures or textured areas (e.g., finger grips, etc.) on an outward side. An attachment tool may have an interfacing mechanism (e.g., one or more protrusions, clips, tabs, etc.) on another side with which the tool may be removably attached to the retainer 1308. In some embodiments, the attachment tool can comprise a multi-pronged screw driver or deployment tube with an end that removably attaches to multiple holes positioned along or around the perimeter of the retainer 1308. The attachment tool can be rotated with respect to the mobile electronic device 1300 to advance the retainer 1308 into a recessed mounting cavity that generally surrounds the onboard lens. In some embodiments, the attachment tool can be configured to pick up the lens 1306 from a storage location and drop or release it in the cavity (e.g., using a tweezer action) in the surface 1310 of the mobile electronic device without requiring contact with human hands to avoid fingerprints, scratches, or other temporary or permanent optical obstructions.

In some embodiments, as illustrated, when the onboard lens 1306 is installed on the mobile electronic device 1300, the upper or outer surface of the onboard lens 1306 and/or the upper or outer surface of the retainer 1308 can be essentially flush with or slightly recessed below the upper or outer planar surface 1310 of the mobile electronic device 1300 in which the onboard lens 1306 is mounted. In some embodiments, a plurality of onboard lenses 1306 can be provided, each of which is configured to be positioned at an essentially flush or slightly recessed level with the upper or outer planar surface 1310 of the mobile electronic device 1300 in which the onboard lens 1306 is mounted. An essentially flush or slightly recessed mounting of a replaceable onboard lens 1306 can be advantageous in that it can help to provide standardization of shape and size so that the mobile electronic device 1300 can be used with other accessories of mobile electronic devices, such as mobile phone cases, and it can help to avoid damage such as scratching to the onboard lens 1306, while still permitting a variety of additional optical photographic options.

The retainer 1308 and a replacement onboard lens 1306 can be positioned at approximately the same location on the surface 1310 of the mobile electronic device 1300 as the original onboard lens 1306 that was provided in the stock mobile electronic device 1300. As illustrated, in some embodiments, the onboard lens 1306 and retainer 1308 can be disposed in a corner region of the mobile electronic device 1300, near both an upper edge and a first side edge, and disposed further from an opposing lower edge and an opposing second side edge. The onboard lens 1306 and the retainer 1308 can be positioned laterally from an onboard microphone 1302 and/or an onboard flash 1304. The onboard lens 1306 and/or retainer 1308 can be provided in any other suitable location, such as in a generally central, upper region of on the surface 1310 of the mobile electronic device 1300. In some embodiments, the onboard microphone 1302 and/or flash 1304 can be removable and replaceable in a manner that is the same as or similar to the replacement of the onboard lens 1308.

As illustrated, in some embodiments, a plurality of lenses 1306 configured to be mounted onboard in a mobile electronic device 1300 can be provided in a holder 1312. The lenses 1306 in this or any other embodiment can comprise a multitude of different optical features, such as variable magnification, fish-eye, protection from scratching, light attenuation (e.g., darkening), light coloring, polarization, anti-reflection, etc. In some embodiments, the lens holder 1312 can comprise a protective covering (not shown). For ease of access, the holder can be affixed, either permanently or removably, to a surface of the mobile electronic device 1300 or to a case generally enclosing or protecting the mobile electronic device 1300.

The following is claimed:

1. An auxiliary optical system configured to be removably attachable to a mobile communication device, the auxiliary optical system comprising:
   a mounting component configured to be removably attachable to a mobile communication device, the mobile communication device having at least one planar face with an onboard camera, wherein the mounting component comprises an optical mounting region configured to be positioned in contact with or adjacent to the planar face of the mobile communication device in an area near the onboard camera when the mounting component is removably attached to the mobile communication device; and
   a plurality of lenses configured to be coupled to the optical mounting region such that at least two lenses of the plurality of lenses are positioned in the optical mounting region in contact with or adjacent to the planar face of the mobile communication device at the same time, and wherein the at least two lenses are in a non-movable configuration with respect to the mobile communication device when secured to the mounting component.

2. The combination of the auxiliary optical system of claim 1 and the mobile communication device.

3. The auxiliary optical system of claim 1, further comprising a multi-lens component, wherein the at least two lenses are configured to be coupled to the optical mounting region via the multi-lens component.

4. The auxiliary optical system of claim 1, wherein at least one of the lenses is a magnifying lens.

5. The auxiliary optical system of claim 1, wherein at least one of the lenses is a wide-angle lens.

6. The auxiliary optical system of claim 1, wherein at least one of the lenses is a polarizing lens.

7. The auxiliary optical system of claim 3, wherein one or more lenses can be removably attached to the multi-lens component.

8. The auxiliary optical system of claim 1, wherein the mounting component is attachable to a corner region of the mobile communication device.

9. The auxiliary optical system of claim 1, wherein the mounting component is attachable to an upper middle region of the mobile communication device.

10. The auxiliary optical system of claim 3, wherein the multi-lens component attaches to the mounting component by a snap fit.

11. The auxiliary optical system of claim 1, wherein at least one lens of the multi-lens component can be removed and reattached to the multi-lens component.

12. The auxiliary optical system of claim 1, wherein the mounting component is configured to resist sliding on the mobile communication device when attached to the mobile communication device.

13. The auxiliary optical system of claim 3, wherein the multi-lens component comprises a detent.

14. The auxiliary optical system of claim 3, wherein the multi-lens component is attached to the mounting component in an oblique orientation with reference to the mobile communication device.

15. The auxiliary optical system of claim 3, wherein the multi-lens component is attached to the mounting component in a generally vertical orientation.

16. The auxiliary optical system of claim 1, wherein an outer periphery of one of the at least two lenses has a different size than the outer periphery of the other of the at least two lenses.

17. The auxiliary optical system of claim 3, wherein the multi-lens component can be removed from the mounting component, rotated and reattached to the mounting component to change one or more optical capabilities of the auxiliary optical system.

18. A method of manufacturing auxiliary optical system configured to be removably attachable to a mobile communication device, the method comprising:
providing a mounting component configured to be removably attachable to a mobile communication device, the mobile communication device having at least one planar face with an onboard camera, wherein the mounting component comprises an optical mounting region configured to be positioned in contact with or adjacent to the planar face of the mobile communication device in an area near the onboard camera when the mounting component is removably attached to the mobile communication device; and
providing a plurality of lenses configured to be coupled to the optical mounting region such that at least two lenses of the plurality of lenses are positioned in the optical mounting region in contact with or adjacent to the planar face of the mobile communication device at the same time, and wherein the at least two lenses are in a non-movable configuration with respect to the mobile communication device when secured to the mounting component.

19. The method of claim 18, further comprising providing a multi-lens component, wherein the at least two lenses are configured to be coupled to the optical mounting region via the multi-lens component.

20. The method of claim 19, wherein the multi-lens component can be removed from the mounting component, rotated and reattached to the mounting component to change one or more optical capabilities of the auxiliary optical system.

* * * * *